Aug. 17, 1937.   F. C. ERNST   2,090,512
AIR COMPRESSOR RELIEF VALVE
Filed Sept. 10, 1934
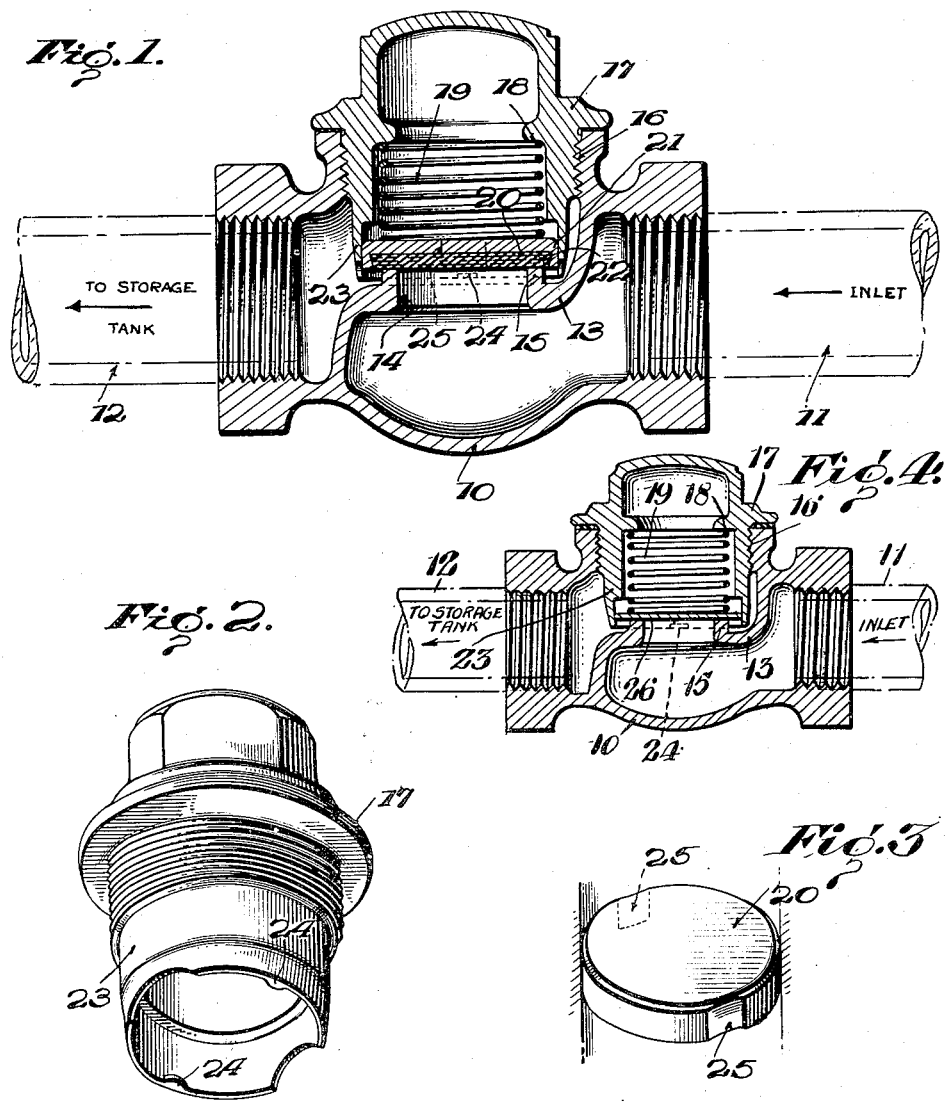
Inventor
Frederick C. Ernst.
By Cameron, Kerkam & Sutton Attorneys Patented Aug. 17, 1937

2,090,512

UNITED STATES PATENT OFFICE 2,090,512

AIR COMPRESSOR RELIEF VALVE

Frederick C. Ernst, Hollis, N. Y., assignor to Jenkins Bros., New York, N. Y., a corporation of New Jersey Application September 10, 1934, Serial No. 743,457

4 Claims. (Cl. 251—144)

This invention relates to check valves, and more particularly to check valves of the character suitable for use with air compressors, as to retain pressure in a storage tank, or the like.

A check valve wherein a valve disk is lifted from its seat against the tension of a spring is well known, as for retaining pressure in a storage tank for example, such a valve being opened when the pressure on the opposite face of said valve exceeds the tension of said spring to permit flow of fluid therepast, as for example from an air compressor. The valve disks of such valves become worn and have to be replaced, and numerous expedients have heretofore been proposed for facilitating access to said valve disks and removal and replacement thereof, but so far as I am aware all devices of this character have involved considerable dismantling of the valve structure in order to gain access to the valve disk, the manipulation of separate attaching means, etc.

It is an object of this invention to provide an improved valve of the type characterized wherein the valve disk becomes readily accessible for renewal, and is so mounted that it is easily renewable, when the bonnet of the valve is removed from the valve casing.

Another object of this invention is to provide a device of the type characterized wherein the valve disk may be located in its operative position or released therefrom by a mere rotary motion thereof or flexure with respect to the valve bonnet whereby said disk may be inserted and removed without use or manipulation of other attaching means.

Other objects will appear as the description of the invention proceeds.

The invention is capable of receiving a variety of mechanical expressions, two of which are shown on the accompanying drawing, but it is to be expressly understood that the drawing is for purposes of illustration only, and is not to be construed as a definition of the limits of the invention, reference being made to the appended claims for that purpose.

Referring in detail to the drawing, wherein the same reference characters are employed to designate corresponding parts in the several figures, Fig. 1 is an axial section of an air compressor check valve embodying the present invention;

Fig. 2 is a perspective view of the bonnet with the valve disk removed;

Fig. 3 is a perspective view of the valve disk.

Fig. 4 is an axial section of a second embodiment.

In the form shown, 10 designates a valve body of any suitable size, construction and material provided with an inlet pipe 11 and an outlet pipe 12 operatively connected thereto, as by a screw thread or other suitable coupling. Interiorly, said valve body 10 has a partition 13 in which is formed a valve port 14 surrounded by a raised valve seat 15 which may be formed integrally with or removably mounted in said partition.

Threaded into the opening 16 in said valve body is a bonnet 17 of any suitable construction and having an interior ledge 18 which constitutes a seat for the coil spring 19 which normally urges the valve disk 20 into engagement with the seat 15 but is yieldable to permit the lifting of the valve disk 20 when the pressure in the inlet exceeds the pressure in the outlet by an amount which exceeds the tension of the spring 19. Valve disk 20 may be of any suitable material and construction, being shown as in the form of a holder 21 recessed to retain a disk 22 of fibrous or other suitable seating material, but if preferred the valve disk may be made in one piece, as for example of thin flat steel.

Bonnet 17 has a depending skirt 23 which is provided with a plurality of inwardly directed ledges 24, preferably two ledges at diametrically opposite points as shown more particularly in Fig. 2, projecting inwardly a short distance. When the valve disk is made of sufficiently thin or flexible material so that it may yield and pass said ledges, said valve disk may be completely circular in form, but when the disk is of relatively rigid construction, it is cut away at its periphery to provide flats 25, corresponding in number and location to said ledges, so that said disk may be passed by said ledges when said flats are in registry therewith, and then rotated until said flats are out of registry with said ledges, whereupon said valve disk is engaged with said ledges by the spring 19 and prevented from escaping from the bonnet. Said ledges 24 are so disposed axially of the bonnet 17 that when said bonnet is screwed home the valve disk engages the seat 15 and is slightly raised from said ledges, so that the latter in no way interfere with the operation of the valve disk while the bonnet is in position.

If the valve disk becomes worn, the bonnet may be removed with the spring 19 and valve disk 20 constituting a unit therewith, the valve disk being held against the ledges 24 by the spring 19. The valve disk may now be readily removed by rotating the same until its flats 25 register with the ledges 24, and a new disk inserted in locked position by reversing the operation, or if the disk will yield sufficiently to pass the ledges 24, the flats are unnecessary and the disk may be inserted or withdrawn by mere flexure thereof.

The embodiment of Fig. 4 is the same as that heretofore described except that the flat valve disk 26 is relatively thin so that it is resiliently yieldable for insertion and withdrawal.

It will therefore be perceived that by the present invention a check valve has been provided which enables the disk to be readily renewed when the bonnet is removed because the disk may be inserted and withdrawn without use or manipulation of separate attaching means and without further dismantling of the valve structure. The valve is simple in construction, inexpensive to manufacture, easy to standardize, and capable of use in valves of a wide variety of sizes, constructions and uses. Therefore, while the embodiment illustrated on the drawing has been described with considerable particularity, it is to be expressly understood that the invention is not restricted thereto, as the invention is capable of receiving other expressions as will now be apparent to those skilled in the art. Reference is therefore to be had to the appended claims for a definition of the limits of the invention.

What is claimed is:—

1. In a valve of the character described, the combination of a valve body having a valve seat therein, a bonnet detachably connected to said valve body and provided with a sleeve which has its inner extremity in surrounding relation to said valve seat, a valve disk mounted in said sleeve, and a coil spring mounted in said sleeve for normally urging said valve disk into engagement with said seat, said sleeve being rigid and provided with a plurality of inwardly directed ledges adjacent the inner extremity of said sleeve and with which said disk is held in engagement by said spring when said bonnet, disk and spring are removed from said valve body as a unit, said disk being constructed to pass said ledges for insertion and removal, and said ledges being so disposed on said sleeve that when said bonnet is mounted in said body said ledges pass beyond the plane of said valve seat and said disk is lifted off said ledges by its engagement with said valve seat.

2. In a valve of the character described, the combination of a valve body having a valve seat therein, a bonnet detachably connected to said valve body and provided with a sleeve which has its inner extremity in surrounding relation to said valve seat, a disk-like valve member mounted in said sleeve, and a coil spring mounted in said sleeve for normally urging said valve disk into engagement with said seat, said sleeve being provided with a plurality of inwardly directed ledges adjacent the inner extremity of said sleeve and with which said disk is held in engagement by said spring when said bonnet, disk and spring are removed from said valve body as a unit, said disk being provided at its periphery with flattened portions corresponding in number and location to said ledges whereby said disk may be moved into and out of said bonnet when said flats are in registry with said ledges, and said ledges being so disposed on said sleeve that when said bonnet is mounted in said body said ledges pass beyond the plane of said valve seat and said disk is lifted off said ledges by its engagement with said valve seat.

3. In a valve of the character described, the combination of a valve body having a valve seat therein, a bonnet detachably connected to said valve body and provided with a sleeve which has its inner extremity in surrounding relation to said valve seat, a flat valve disk mounted in said sleeve, and a coil spring mounted in said sleeve for normally urging said valve disk into engagement with said seat, said sleeve being rigid and provided with a plurality of inwardly directed ledges adjacent the inner extremity of said sleeve and with which said disk is held in engagement by said spring when said bonnet, disk and spring are removed from said valve body as a unit, said valve disk being resilient to pass said ledges for insertion and removal into and out of said bonnet, and said ledges being so disposed on said sleeve that when said bonnet is mounted in said body said ledges pass beyond the plane of said valve seat and said disk is lifted off said ledges by its engagement with said valve seat.

4. In a valve of the character described, the combination of a valve body having a valve seat therein, a bonnet detachably connected to said valve body and provided with a sleeve which has its inner extremity in surrounding relation to said valve seat, a valve disk mounted in said sleeve, and a coil spring mounted in said sleeve for normally urging said valve disk into engagement with said seat, said sleeve being provided with a plurality of inwardly directed ledges adjacent the inner extremity of said sleeve and with which said disk is held in engagement by said spring when said bonnet, disk and spring are removed from said valve body as a unit, said valve disk having peripheral portions shaped to pass said ledges whereby said valve disk may be inserted into position against the tension of said spring and then rotated for retention by said ledges, and said ledges being so disposed on said sleeve that when said bonnet is mounted in said body said ledges pass beyond the plane of said valve seat and said disk is lifted off said ledges by its engagement with said valve seat.

FREDERICK C. ERNST.